(12) United States Patent
Brill et al.

(10) Patent No.: US 6,600,873 B1
(45) Date of Patent: Jul. 29, 2003

(54) METHOD AND APPARATUS FOR DETECTING MODIFIED COLOR BURST SIGNALS TO PREVENT THE COPYING OF A VIDEO PROGRAM

(75) Inventors: Gerow D. Brill, Danbury, CT (US); John O. Ryan, Woodside, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/381,184
(22) PCT Filed: Mar. 20, 1998
(86) PCT No.: PCT/US98/05798
§ 371 (c)(1), (2), (4) Date: Sep. 13, 1999
(87) PCT Pub. No.: WO98/43420
PCT Pub. Date: Oct. 1, 1998
(51) Int. Cl.[7] .................. H04N 5/91; G11B 19/04
(52) U.S. Cl. .................. 386/94; 386/95; 360/60
(58) Field of Search .................. 386/94, 95, 1, 386/10, 12, 19, 28, 84, 100, 113; 362/15, 60; 380/201, 204, 203; H04N 5/91; G11B 19/04

(56) References Cited

U.S. PATENT DOCUMENTS 6,002,830 A * 12/1999 Quan
6,516,132 B1 * 2/2003 Wrobleski et al.

FOREIGN PATENT DOCUMENTS

WO    WO 96/36174    * 11/1996

* cited by examiner

Primary Examiner—Robert Chevalier
(74) Attorney, Agent, or Firm—G. Almeida

(57) ABSTRACT

A video signal is modified so that a television receiver will provide a normal color picture but a video tape recorder will detect the modification and prohibit the video signal from being recorded. The color burst phase of the video signal is modified so as to make inferior quality pictures in the event that the resulting modified video signal is recorded. A disabling circuit (22) associated with the recorder (20) detects the presence of the modified video signal. This detection is done by determining the presence of modified color burst phase signals in even a single television line of the video signal. A control signal (26) is produced when the modified color burst phase signal is detected, which disables the recorder (20). If no modified color burst phase signal is detected, the recorder (20) is enabled to allow an acceptable recording of the video signal.

14 Claims, 3 Drawing Sheets

METHOD AND APPARATUS FOR DETECTING MODIFIED COLOR BURST SIGNALS TO PREVENT THE COPYING OF A VIDEO PROGRAM

BACKGROUND OF THE INVENTION

This invention relates to a method and apparatus for preventing the copying of a video program. More particularly, it relates to detecting, a modified color burst signal in even a single television line of a video signal to cause disabling of the recording portion of a video recording device when the modified video signal is detected.

Various apparatuses and methods have been developed for modifying a video signal so that a normal color picture may be produced by a television receiver receiving the modified video signal, but that video recording of the modified video signal is impaired. That is, a video picture produced from the video signal as recorded on a video tape recorder is altered so that it makes unacceptable viewing.

U.S. Pat. No. 4,631,603 ('603) entitled "Method and Apparatus for Processing a Video Signal so as to Prohibit the Making of Acceptable Video Tape Recordings Thereof," which is incorporated by reference, discloses such a method and apparatus. It describes adding ordered pairs of pseudo-sync pulses and white pulses during the vertical blanking interval. These pulse pairs act in concert to confuse the automatic gain system of a video cassette recorder (VCR), leading to generally unviewable pictures.

U.S. Pat. No. 4,907,093 ('093) entitled "Method and Apparatus for Preventing The Copying of a Video Program," which is incorporated by reference, discloses a method and apparatus for detecting the ordered pairs of pseudo-sync pulses and white pulses described in the '603 patent and disabling the recording function of a video cassette recorder. The '093 patent discloses several detection methods.

U.S. Pat. No. 4,577,216, "Method and Apparatus For Processing a Video Signal," issued Mar. 18, 1986 and incorporated by reference, discloses modifying a color video signal to inhibit the making of acceptable video recordings thereof A conventional television receiver produces a normal color picture from the modified signal. However, the resultant color picture from a subsequent video tape recording shows variations in the color fidelity that appear as bands or stripes of color error. Colloquially the modifications are called the "Colorstripe™" system or the "Colorstripe™" process. The term "Colorstripe" is a trademark of the assignee of this application. Commercial embodiments of the teachings of this patent typically limit the number of video lines per field having the induced color error or color stripes.

Color video signals (both in the NTSC and PAL color television standard systems) include what is called a color burst. The Colorstripe™ system modifies the color burst. The suppression of the color subcarrier signal at the television (TV) transmitter requires that the color TV receiver include (in NTSC) a 3.58 MHz oscillator which is used during demodulation to reinsert the color subcarrier signal and restore the color signal to its original form. Both the frequency and phase of this reinserted subcarrier signal are critical for color reproduction. Therefore, it is necessary to synchronize the color TV receiver's local 3.58 MHz oscillator so that its frequency and phase are in step with the subcarrier signal at the transmitter.

This synchronization is accomplished by transmitting a small sample of the transmitter's 3.58 MHz subcarrier signal during the back porch interval of the horizontal blanking pulse. FIG. 1 shows one horizontal blanking interval of an NTSC color signal. The horizontal sync pulse, the front porch and blanking interval duration are essentially the same as that for black and white TV. However, during color TV transmission (both broadcast and cable) 8 to 10 cycles of the 3.58 MHz subcarrier that is to be used as the color sync signal are superimposed on the back porch. This color sync signal is referred to as the "color burst" or "burst". The color burst peak-to-peak amplitude (40 IRE for NTSC TV as shown) is the same amplitude as the horizontal sync pulse.

FIG. 1A shows an expanded view of a part of the waveform of FIG. 1 including the actual color burst cycles. During the color TV blanking intervals, such a color burst is transmitted following each horizontal sync pulse.

In one commercial embodiment of the Colorstripe™ process, no color burst phase (stripe) modification appears in the video lines that have a color burst signal during the vertical A blanking interval. These are lines 10 to 21 in an NTSC signal and corresponding lines in a PAL signal. The color burst modifications occur in bands of four to five video lines of the viewable TV field followed by bands of eight to ten video lines without the color burst modification. The location of the bands is fixed ("stationary") field-to-field. This Colorstripe™ process has been found to be quite effective for cable television, especially when combined with the teachings of U.S. Pat. No. 4,631,603 also invented by John O. Ryan and incorporated herein by reference.

In NTSC TV, the start of color burst is defined by the zero-crossing (positive or negative slope) that precedes the first half cycle of subcarrier (color burst) that is 50% or greater of the color burst amplitude. It is to be understood that the Colorstripe™ process shifts the phase of the color burst cycles relative to their nominal (correct) position, illustrated for example in FIG. 1A. An example of a phase shifted color burst is shown in FIG. 1B. The amount of phase shift shown in FIG. 1B is 180° (the maximum possible) over the entire color burst.

Further, the amount of phase shift in the Colorstripe™ process can vary from e.g. 20° to 180°; the more phase shift, the greater the visual effect in terms of color shift. In a Colorstripe™ process for PAL TV, a somewhat greater phase shift (e.g. 40° to 180°) is used to be effective.

FIG. 1C illustrates a color burst signal which is partially modified, that is, is partially phase shifted, to prevent making a recording of the associated video signal. In an exemplary NTSC embodiment, such as disclosed in the PCT Application Number US96/17719 incorporated by reference, a system called Advanced Switched Burst (ASB) has the capability of programming various combinations of partially modified color burst signals. FIG. 1C illustrates one of such combinations, by way of example only, wherein the color burst envelope comprises three zones. Zone 1 (burst start) begins 4.96 microseconds ($\mu$secs) after the leading edge of horizontal sync. Zone 1 ends 1.48 $\mu$secs after normal burst start. Zone 2 begins and ends at the end of Zone 1. In this particular embodiment, there is no Zone 2 per se. Zone 3 begins after the Zone 2 point and extends 1.48 $\mu$secs to the end of burst. Therefore, in this particular embodiment, the color burst has a width of 4.96 $\mu$secs. The Zone 1 area will contain modified (inverted 180°) subcarrier. Normal phase subcarrier is used in Zone 2 (zero duration) and Zone 3.

Although three zones are illustrated in FIG. 1C by way of example, the color burst may be partially phase shifted using other numbers of zones, e.g. two, etc., and phase shifting may be applied to various ones of the zones.

Other variations of the Colorstripe™ process are described in the following provisional applications: Serial No. 60/010015 by William J. Wrobleski entitled An Improved Method And Apparatus For Modifying The Color Burst To Prohibit Video Tape Recording, Serial No. 60/010779 by William J. Wrobleski, entitled An Advanced Color Burst Method And Apparatus For Modifying The Color Burst To Prohibit Videotape Recording, Serial No. 60/014246 by William J. Wrobleski, entitled A Method And System Of Copy Protection Using An Advanced And Split Color Burst. The three applications were combined in a U.S. non-provisional patent application which issued Feb. 4, 2003 as U.S. Pat. No. 6,516,132.

Methods and apparatuses for defeating the effects of the color burst modifications of the '216 patent and others are described in U.S. Pat. No. 4,626,890 entitled "Method and Apparatus for Removing Phase Modulation From the Color Burst," and incorporated by reference. Methods and apparatuses for detecting a Colorstripe™ signal and for additional defeat methods and apparatuses are described in application Ser. No. 08/438,155 by Ronald Quan and John O. Ryan, filed May 9, 1995 entitled Method And Apparatus For Defeating Effects Of Color Burst Modifications To A Video Signal, U.S. Pat. No. 5,784,523 granted Jul. 21, 1998, U.S. Pat. No. 6,516,132 granted Feb. 4, 2003 and U.S. Pat. No. 6,327,422 granted Dec. 4, 2001 are incorporated herein by reference.

SUMMARY OF THE INVENTION

The present invention provides an apparatus and method for preventing the recording of selected video signals. More particularly, the present invention provides for detecting a Colorstripe™ modified video signal at a recording device, and disabling the recording device when the respective modified color burst signal is detected. Unmodified signals correspondingly result in the recording device being enabled, so that the video signal may be recorded. However, when video tapes are originally recorded with a recognizable copy protecting modified color burst waveform, the tape recording device is completely disabled so that it cannot record the video signal at all.

More particularly, a video signal is supplied to a recording device and also to a disabling means whose output is a control signal for enabling or disabling the recording device. That is, if the video signal is modified to include a partially or entirely modified, for example, phase shifted, color burst signal on even one line of the video signal, the recording device will be disabled by the disabling means to prevent an acceptable recording of the modified video signal. If no modified color burst signal is detected by the disabling means, an acceptable recording is allowed.

The disabling means includes means for generating a timing window which encompasses the time duration of the back porch interval and thus of the color burst signal. The video signal, modified or unmodified, thus is supplied to a phase lock loop circuit only during the presence of the color burst signal. A color burst signal which is modified by being partially or entirely phase shifted causes a voltage to be produced by the phase lock loop circuit which is different than the voltage produced when an unmodified color burst signal is supplied to the phase lock loop circuit. Every television line is checked to determine if any line is modified. Since the detection process is limited by the window generator to the interval during which only the color burst signal is present, the phase lock loop circuit cannot respond to active video or to other non-color burst signals. The voltage difference between a modified and unmodified television line is sampled and used to respectively disable or enable the recording device.

These and other features and advantages of the present invention will be more clearly understood from a consideration of the drawings and the following detailed description of the preferred embodiments.

DETAILED DESCRIPTION OF THE EMBODIMENTS

Even though commercial embodiments of the color burst modifications described above are generally well known, any detection circuitry must be capable of detecting any color burst modification type. Additionally, the detection circuitry cannot be dependent upon knowledge of which particular lines, or in how many lines, the color burst modification may appear. For example, many times the Colorstripe™ process is not fixed in line location. Other times, even where it is so fixed, it is not desired or possible to provide the pre-programmed memory required to detect any combination of Colorstripe™ line locations and numbers. Therefore, in accordance with the invention, a color burst modification phase detector detects, for each video line, the presence of a Colorstripe™ burst; that is, detects color bursts on a line or any combination of lines having induced phase modulation.

The detecting technique approach of the invention employs a phase detection means which includes a subcarrier regeneration circuit such as a phase lock loop, crystal filter or frequency multiplier circuit for determining the phase of the color burst. The invention then compares this detected phase to a nominal phase (using a phase comparison) and provides an indicator signal when a modified color burst is present, i.e. when the color burst phase has been modified to deviate from the normal correct phase. This indicator or control signal then is used to disable the recorder's recording circuit in the presence of the color burst phase modifications.

Figure 2:
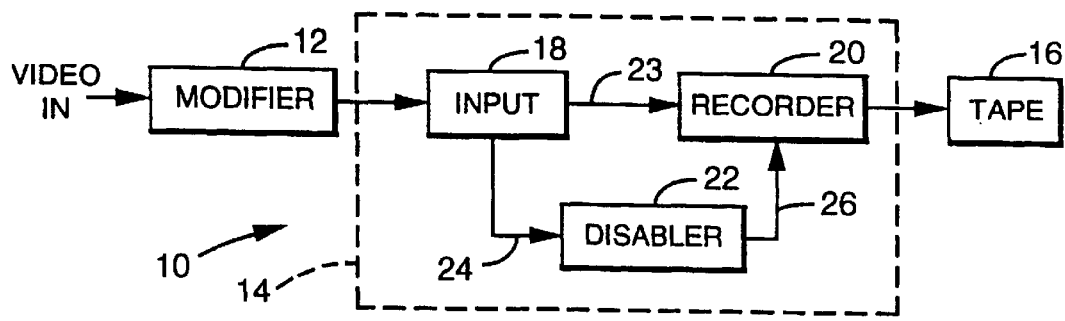
FIG. 2 is a simplified block diagram of a system configured with a disabler means of the present invention in a recording device environment.

Referring initially to FIG. 2, a system for preventing the copying of a video program in accordance with the present invention is shown generally at 10. A conventional video signal with or without a modified color burst signal is supplied to video signal modifier 12. Modifier 12 is preferably one of the apparatuses described in the previously referenced U.S. Pat. No. 4,577,216 or one of the following previously referenced applications Serial Nos. 60/010015, 60/010779 or 60/014246 now issued Feb. 4, 2003 as U.S. Pat. No. 6,516,132, or PCT Application No. US96/17719. The modifier 12 supplies the video signal, with or without a modified color burst signal, to an apparatus 14 which includes an input 18, a recording device 20 and a disabling means or apparatus 22. The input 18 supplies the modified or unmodified video signal to the recording device 20 via a bus 23, and to the disabling circuit 22 via a bus 24. The disabling apparatus 22 detects the presence or absence of a modified color burst signal in each video line of the video signal, and supplies a control signal to the recorder device 20 via a lead 26. The control signal then is used to disable or enable the recording device to prevent or allow a recording to be made of the video signal on a recording tape or medium 16.

Figure 1:
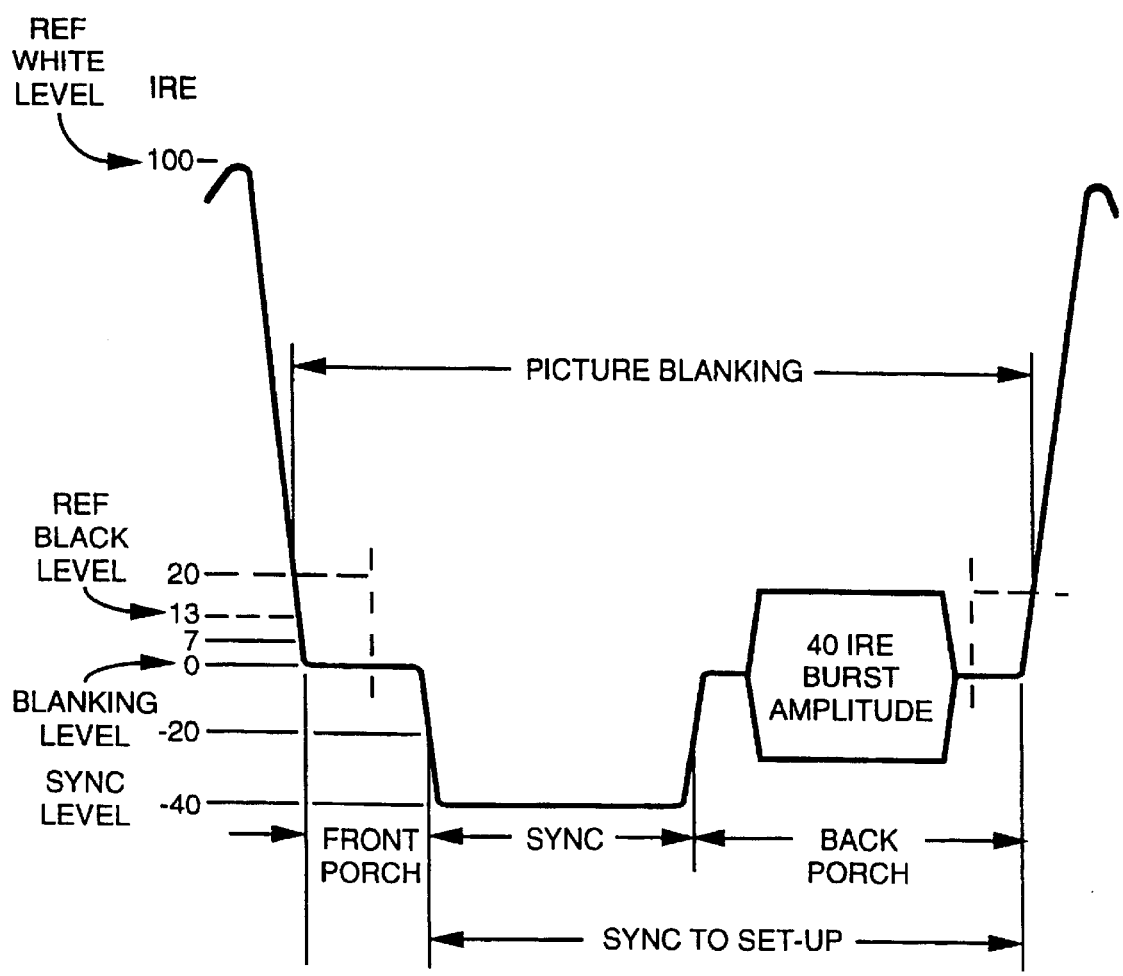
FIG. 1 is a waveform of a conventional horizontal blanking interval of a NTSC color television standard signal.
Figure 1A:
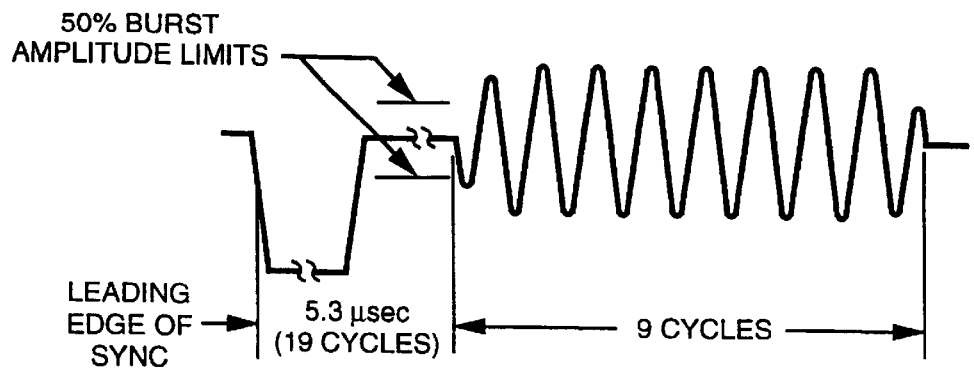
FIGS. 1A and 1B, 1C are waveform diagrams of a horizontal blanking interval, including conventional and modified color burst signals, respectively, of a NTSC color television signal.
Figure 1B:
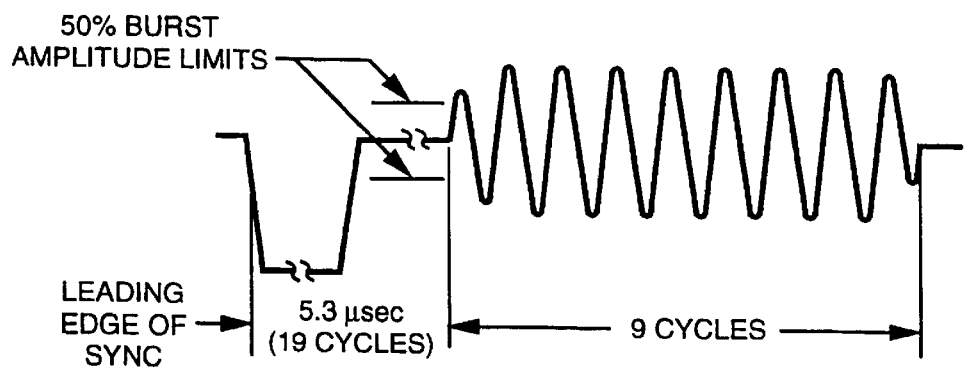
Figure 1C:
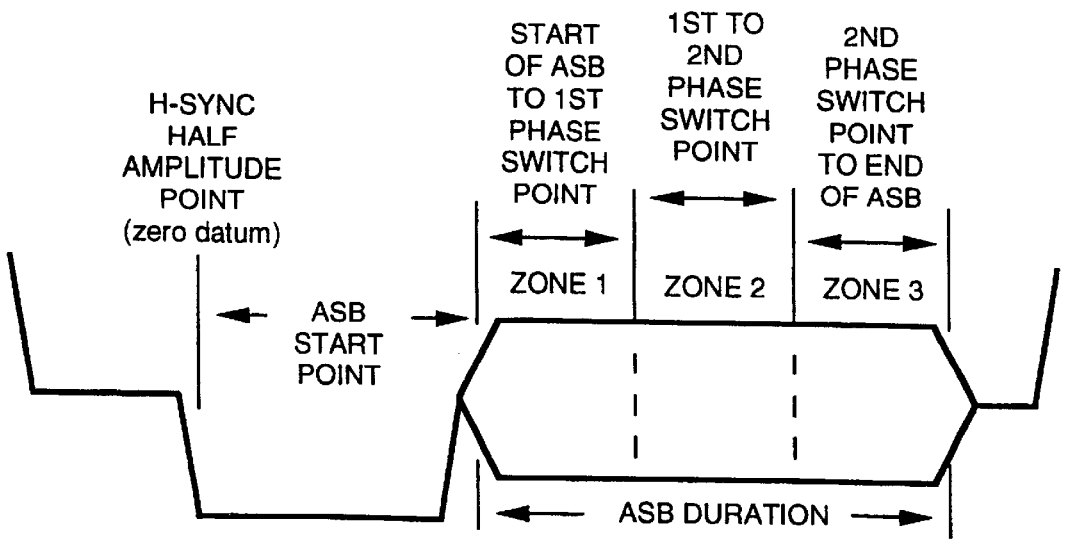
Figure 3:
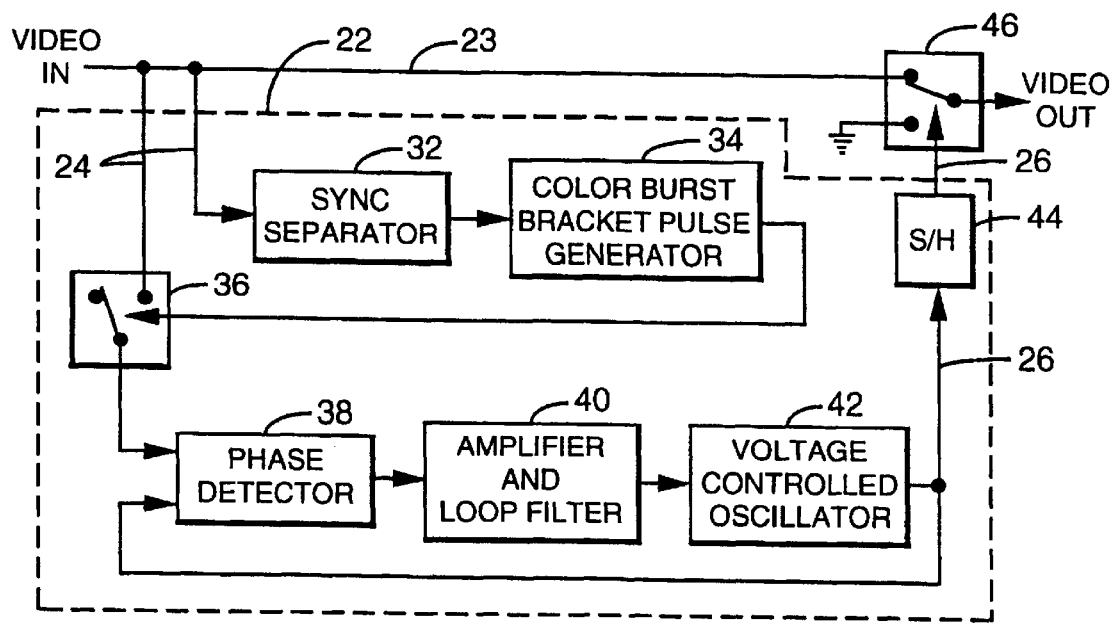
FIG. 3 is a block diagram illustrating an embodiment of the disabler means of FIG. 2.

A specific embodiment of the disabling apparatus 22 to detect a modified color burst signal and disable the record function is illustrated in FIG. 3. A video signal containing (or not containing) a modified color burst signal, is supplied to the recording device 20 via the video bus 23 and to the apparatus 22 via the video bus 24. This modified (or unmodified) video signal is coupled to a sync separator 32 via the bus 24 to separate the synchronizing pulses from the video signal. The synch separator 32, suitable circuits for which are generally known, generates synchronizing pulses from the incoming video signal. The extracted synchronizing signals are coupled to a window generator or color burst bracket pulse generator 34. The trailing edges of the sync pulses trigger the color burst bracket pulse generator 34, which in its simplest form can simply be a monostable multivibrator of at least 3 μsecs duration. The width of the color burst bracket pulse or window is equal to the back porch period of the horizontal blanking interval, illustrated for example in FIG. 1. By making the color burst bracket pulse wider than normal color burst widths, it is possible to detect the color burst modifications described in previously referenced U.S. Pat. No. 6,516,132 and PCT Application No. US96/17719.

The output of the color burst bracket generator 34 is coupled to the control element of a switch 36. The switch 36 couples the video input signal containing a modified (or unmodified) video signal to the input of a phase detector 38 only during the back porch period. This prevents a subsequent phase lock loop system comprising the phase detector 38, an amplifier and loop filter 40 and a voltage controlled oscillator 42, from being controlled by or responding to active video or other non-color burst signals.

The output of the phase detector 38 is coupled to the amplifier and loop filter 40, where the output of the phase detector is amplified and filtered and coupled to the voltage controlled oscillator 42. An incorrect color burst phase from a Colorstripe™ signal causes a different voltage to appear at the output of the phase lock loop then would appear if the color burst signal was not modified. The voltage level output of the phase lock loop is coupled to a sample and hold circuit 44 that detects the voltage difference and thus the presence or absence of the incorrect phase signals. The output of the sample and hold circuit is coupled to a switch 46 which disables the recording when the modified color burst signal is present and enables the recording process when the color burst signal is not modified. The switch 46 is inserted in the input bus leading to the recording device 20, and the disabling circuit 22 and/or the switch 46 may be located prior to or within the recording device 20.

This disclosure is illustrative and not limiting, further modifications will be apparent to one skilled in the art and are intended to fall within the scope of the appended claims and their equivalents.

What is claimed is:

1. A method for processing a video signal to prevent the making of video recordings therefrom, wherein the video signal has unmodified color burst signals and a color burst signal containing a modified phase relationship in selected television lines in a field of the video signal, said method comprising:

receiving the video signal with the modified color burst signal;

detecting the absence or presence of the modified color burst signal in the television lines within a timing window which encompasses the color burst signal;

generating a control signal indicating the absence or presence of the modified color burst signal in said lines of the video signal;

disabling a recording device to prevent recording of individual television lines of the video signal when the control signal indicates the presence of the modified color burst in the respective modified line of the video signal; and enabling the recording device to allow recording of television lines when the control signal indicates the absence of the modified color burst in the respective unmodified lines of the video signal.

2. A method according to claim 1 wherein said modified color burst signal comprises a phase inversion of a color burst in the modified unrecorded television line of the video signal.

3. A method according to claim 1 wherein said modified color burst signal comprises a phase inversion of a selected portion of a color burst in the modified unrecorded television line of the video signal.

4. A method according to claim 1 wherein said modified color burst signal comprises a color burst signal beginning coincident with a trailing edge of a horizontal sync pulse and containing phase inversion of a selected portion of said color burst in the modified television line of the video signal.

5. A method according to claim 2 wherein said step of detecting further includes:

enabling a phase lock loop during said timing window to detect phase differences in the color burst signals between unmodified and modified television lines.

6. A method according to claim 5 wherein said step of detecting further includes:

generating a voltage difference indicative of a modified television line; and sampling the voltage of the phase lock loop to provide the control signal for disabling the recording device during said modified television line when said voltage difference is detected.

7. A method according to claim 1 wherein the step of disabling recording includes:

generating a control voltage indicative of the presence of a color burst phase shift in a single television lines in the field of the video signal; and disabling recording of the received video signal when the control voltage indicates the presence of the phase shift in the modified color burst signal in the single television line.

8. Apparatus for selectively enabling the making of video recordings of a video signal on a recording medium, which signal has unmodified color burst signals on selected television lines and a modified color burst signal in one or more television lines, comprising:

input means for receiving the video signal;

recorder means coupled to said input means for recording video signals on the recording medium;

a pulse generator for providing a timing window signal whose duration encompasses the duration of the color burst signal;

a phase lock loop responsive to the pulse generator for generating a voltage difference during said timing window signal which is indicative of the presence or absence of the modified color burst signal in said one or more television lines;

means responsive to the phase lock loop for generating a control signal indicative of the voltage level of said voltage difference; and switch means coupled to the input means for disabling or enabling recording of respective television lines of the video signal by the recorder means in response to the control signal.

9. An apparatus according to claim 8 wherein said modified color bust signal comprises a phase inversion of a color burst in the modified television line of the video signal.

10. An apparatus according to claim 9 wherein said modified color burst signal comprises a phase inversion of a selected portion of a color burst in the modified television line of the video signal.

11. An apparatus according to claim 8 wherein said modified color burst signal comprises a color burst signal beginning coincident with a trailing edge of a horizontal sync pulse and containing phase inversion of a selected portion of said color burst in the modified television line of the video signal.

12. A method for processing a video signal having an unmodified color burst signal on selected television lines and a modified color burst signal on at least one line in a field of the video signal, comprising:

phase detecting the color burst signal in a television line of the video signal;

generating a voltage difference indicative of the presence of the modified color burst signal on said television line;

sampling the voltage difference to distinguish that said television line contains an unmodified color burst signal or the modified color burst signal;

disabling a recording of the modified television line in the field in response to the sampled voltage difference being indicative of the presence of a modified color burst signal; and enabling a recording of the unmodified television line in response to the sampled voltage difference being indicative of the presence of an unmodified color burst signal.

13. A method according to claim 12 including:

providing a timing window signal which encompasses the duration of the modified color burst signal; and enabling the step of phase detecting in response to the timing window signal.

14. A method according to claim 13 wherein the step of generating includes:

generating a first voltage during the timing window signal indicative of the presence of a modified color burst signal; and generating a second voltage during the timing window signal indicative of the absence of the modified color burst signal.

* * * * *